(12) United States Patent
Cox

(10) Patent No.: US 7,866,540 B2
(45) Date of Patent: Jan. 11, 2011

(54) SHOCK AND VIBRATION ABSORBING DEVICE AND METHOD

(76) Inventor: Leonard R. Cox, P.O. Box 183, Tipp City, OH (US) 45371

( * ) Notice: Subject to any disclaimer, the term of this patent is extended or adjusted under 35 U.S.C. 154(b) by 1043 days.

(21) Appl. No.: 11/440,279

(22) Filed: May 24, 2006

(65) Prior Publication Data

US 2006/0267358 A1 Nov. 30, 2006

Related U.S. Application Data

(60) Provisional application No. 60/683,905, filed on May 24, 2005.

(51) Int. Cl.
*A47G 29/12* (2006.01)
(52) U.S. Cl. .......................... 232/39; 248/560
(58) Field of Classification Search .................. 232/39; 248/560, 131, 417, 418; 267/136; 293/102
See application file for complete search history.

(56) References Cited

U.S. PATENT DOCUMENTS

| | | | |
|---|---|---|---|
| 697,450 A * | 4/1902 | Corbin | ........................ 232/17 |
| 3,870,286 A | 3/1975 | Willich | |
| 4,401,298 A | 8/1983 | Eaton et al. | |
| 4,700,931 A | 10/1987 | Eberhard et al. | |
| 5,070,974 A | 12/1991 | Kirkwood | |
| 5,622,343 A * | 4/1997 | Morton | ........................ 248/131 |
| 5,699,989 A * | 12/1997 | Guthrie | ................... 248/219.2 |
| 5,947,453 A | 9/1999 | Eastman et al. | |
| 7,195,146 B1 * | 3/2007 | Dunn et al. | .................... 232/39 |
| 2008/0042332 A1 * | 2/2008 | Tseng | ........................ 267/136 |

* cited by examiner

*Primary Examiner*—William L. Miller
(74) *Attorney, Agent, or Firm*—James Ray & Assoc

(57) ABSTRACT

A resilient device for absorbing at least one of shock and vibration includes a first portion, and a second portion which extends outwardly from the first portion and curves in a first direction away from the first portion and then recurves in a second direction towards the first portion. The method includes the step of securing the first portion to one of a first member and a second member disposed in spaced relationship to the first member and the step of abuttingly engaging the second portion to an opposed one of the first member and the second member wherein the second member is capable of withstanding application of at least one of shock and vibration and the resilient member temporarily changes its original shape for absorbing such at least one of shock and vibration.

16 Claims, 6 Drawing Sheets

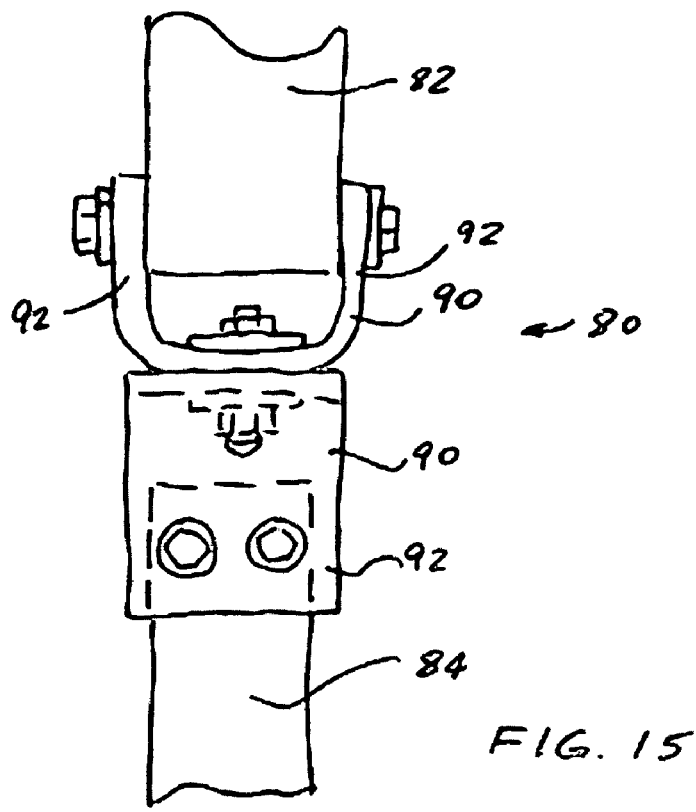
FIG. 15
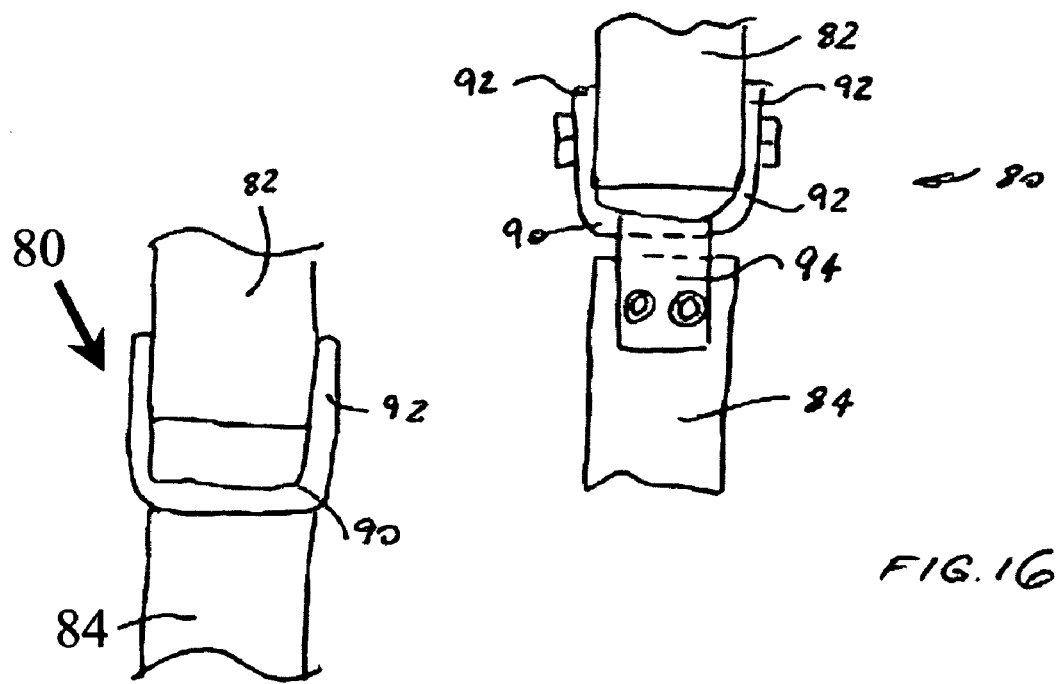
FIG. 17
FIG. 16

SHOCK AND VIBRATION ABSORBING DEVICE AND METHOD

CROSS-REFERENCE TO RELATED APPLICATIONS

This application is related to and claims priority from Provisional Patent Application Ser. No. 60/683,905 filed May 24, 2005.

FIELD OF THE INVENTION

The present invention relates, in general, to shock and vibration absorbers and, more particularly, this invention relates to a resilient device for protecting mailboxes from shocks and vibration and, still more specifically, this invention relates to a resilient device for protecting preselected objects from shocks and vibration.

BACKGROUND OF THE INVENTION

Although the invention will be described as it relates to mailboxes it is to be understood that it is not limited thereto or thereby. As is generally well known, mailboxes, particularly those installed in rural areas, are vulnerable to damage due to their location on public thoroughfares as well as to difficulties by the box owner to view such mailboxes from their homes. The damage is mainly caused by the impact of an external force generated by baseball bats, rocks, water balloons, snow plow discharge, beer bottles and the like. As a result of such impact force, the mailbox looses its permanent attachment with the stationary mounting post.

A device taught in U.S. Pat. No. 5,699,989 to Guthrie fails to simply and economically resolve problems associated with mailbox attachment.

SUMMARY OF THE INVENTION

According to one embodiment of the invention, there is provided a method of absorbing at least one of a shock and a vibration. The method includes the steps of providing at least one resilient member having each of a predetermined shape, a first portion and a second portion which extends outwardly from the first portion. The second portion curves in a first direction which is away from the first portion and then recurves in a second direction which is towards the first portion. The method further includes the step of securing the first portion to one of a first member and a second member disposed in a spaced relationship to the first member and then at least abuttingly engaging the second portion to an opposed one of the first member and the second member. The second member is capable of withstanding application of at least one of a shock and a vibration, whereby the resilient member temporarily changes its original shape for absorbing such at least one of shock and vibration.

According to another embodiment, the invention provides a method of absorbing at least one of a shock and a vibration. The method includes the steps of providing at least one pair of resilient members, affixing each of the at least one pair of resilient members together, then coupling a first resilient member to a first member and then at least abuttingly engaging a second resilient member to a second member disposed in a spaced relationship to the first member, wherein the resilient member temporarily changes its original shape for absorbing such at least one of shock and vibration.

According to yet another embodiment of the invention, there is provided at least one resilient member coupled to a preselected object, such as a mailbox, and to a vertical post for absorbing at least one of a shock and a vibration generated by a force applied to such preselected object. The at least one resilient member temporarily changes its original shape for absorbing such at least one of shock and vibration.

OBJECTS OF THE INVENTION

It is, therefore, one of the primary objects of the present invention to provide a device for absorbing shock and vibration which is resilient.

Another object of the present invention is to provide a device for absorbing shock and vibration which has a unitary construction.

Yet another object of the present invention is to provide a device for absorbing shock and vibration which is operable in pressurized and non-pressurized environments.

Still another object of the present invention is to provide a device for absorbing shock and vibration which is operable within various temperature ranges.

A further object of the present invention is to provide a device for absorbing shock and vibration which is not affected by climatic environments.

Yet a further object of the present invention is to provide a device for absorbing shock and vibration which is operable in harsh and chemically reactive environments.

Still a further object of the present invention is to provide a device for absorbing shock and vibration which is relatively inexpensive to produce.

An additional object of the present invention is to provide a device for absorbing shock and vibration which is simple to install.

Another object of the present invention is to provide a method of absorbing shock and vibration.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 15 is an elevation view of an alternative embodiment of the shock and vibration absorbing device of FIG. 14;

FIG. 16 is an elevation view of another alternative embodiment of the shock and vibration absorbing device of FIG. 14; and FIG. 17 is an elevation view of yet another alternative embodiment of the shock and vibration absorbing device of FIG. 14.

BRIEF DESCRIPTION OF THE VARIOUS EMBODIMENTS OF THE INVENTION

Figure 1:
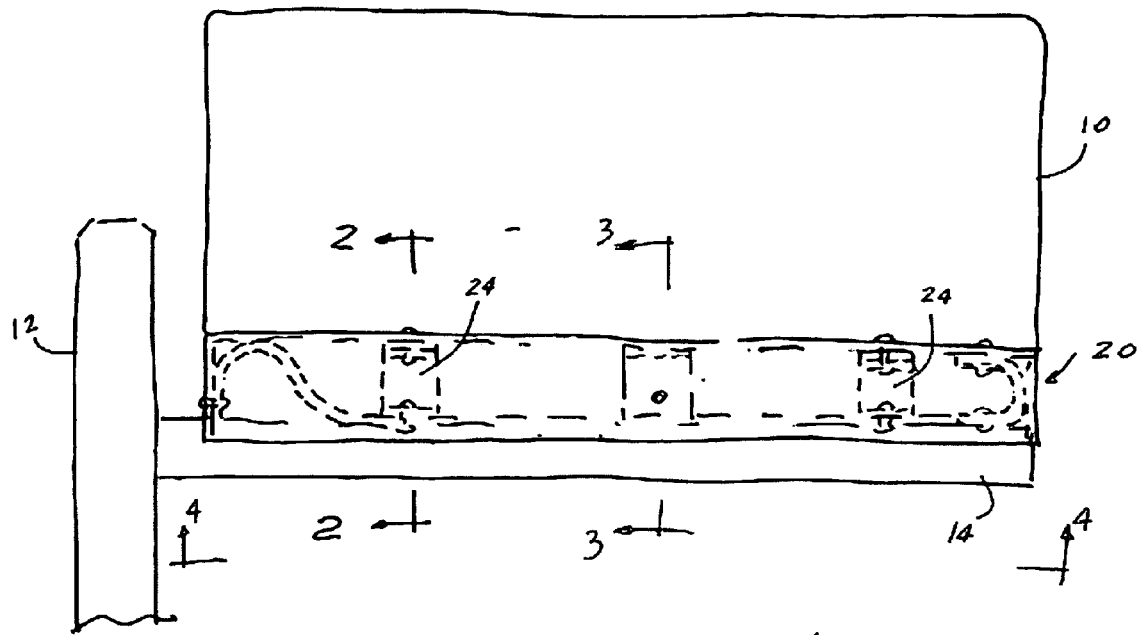
FIG. 1 is a side elevation view of a shock and vibration absorbing device of the present invention illustrated in combination with a mailbox.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the shock and vibration may be of a mechanical, thermal or acoustical nature.

Now in reference to FIG. 1, there is shown a mailbox 10 and a vertically and stationary mounted support post 12 having a generally horizontal arm 14. A resilient member, generally designated as 20, according to one embodiment of the present invention, is coupled to such mailbox 10 and to either such vertical post 12 or its arm 14 for absorbing at least one of a shock and a vibration generated by an impact force applied to such mailbox 10. Such resilient member 20 has a predetermined shape. The resilient member 20 includes a first portion 22 and a second portion 24 which extends outwardly from the first portion 22 and curves in a first direction which is away from the first portion 22 and then recurves in a second direction which is towards the first portion 22. Each of a free edge of the first portion 22 and free edge 28 of the second portion 24 has a predetermined shape. It will be appreciated that since the mailbox 10 has a generally rectangular base, the free edge of each of the first portion 22 and the second portion 24 is generally straight and furthermore, such free edges are generally parallel to each other.

Figure 2:
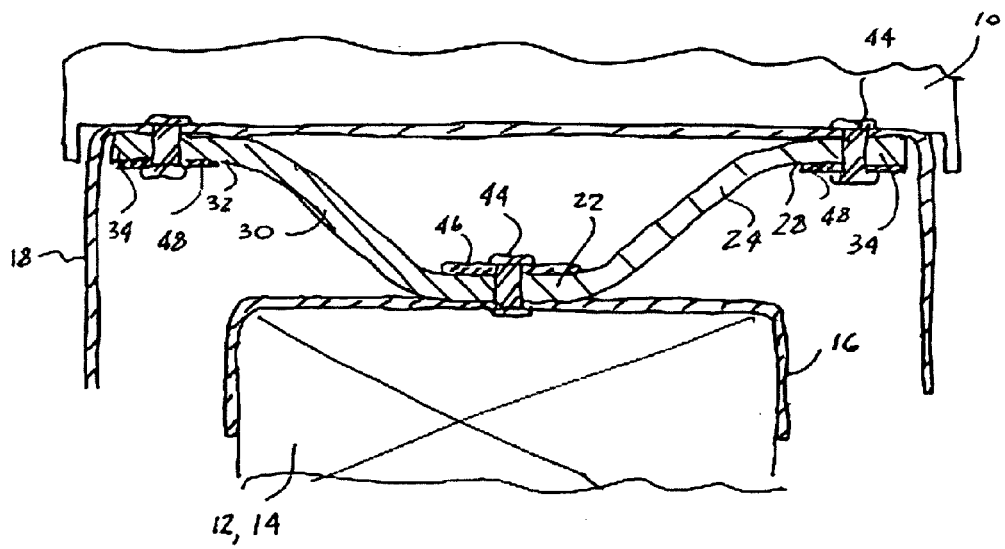
FIG. 2 is a cross-sectional view of the shock and vibration absorbing device taken along the lines 2-2 of FIG. 1.
Figure 3:
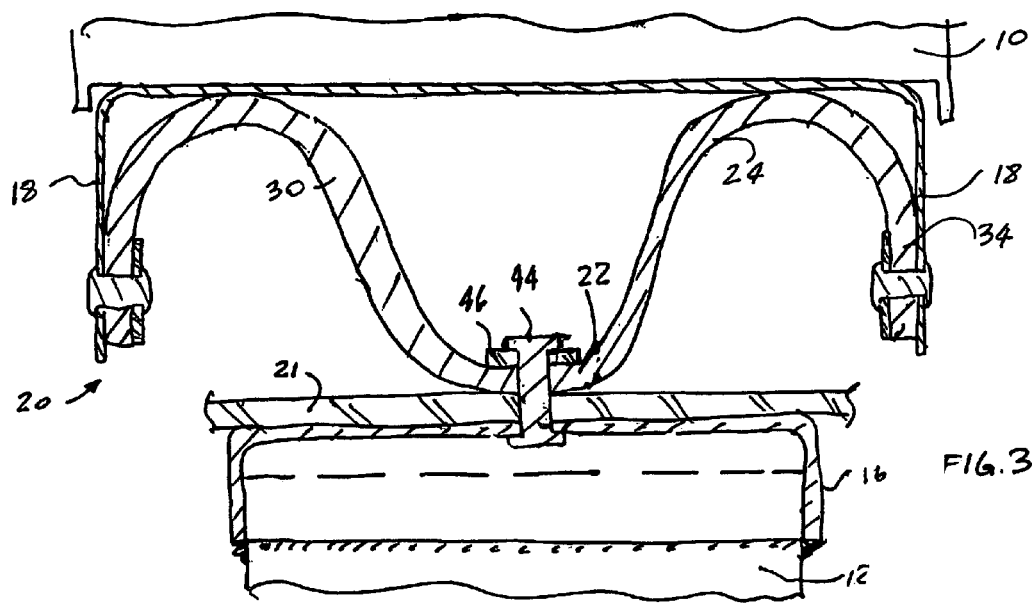
FIG. 3 is a cross-sectional view of the shock and vibration absorbing device taken along the lines 3-3 of FIG. 1.
Figure 4:
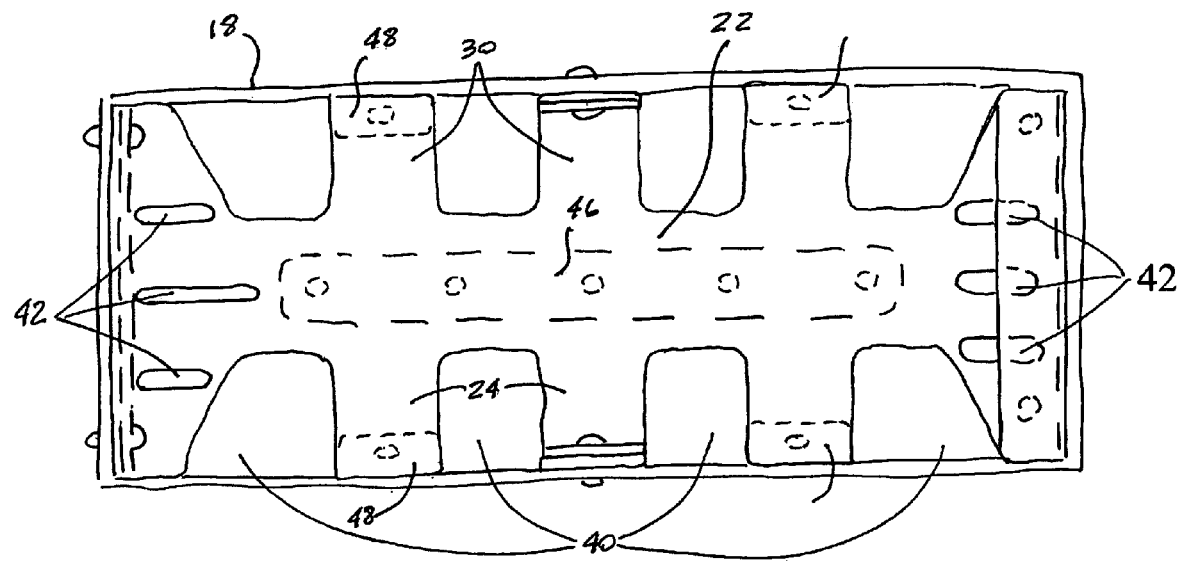
FIG. 4 is a plan view of the shock and vibration absorbing device of FIG. 1.

Resilient member 20 may further include a third portion 30 which extends outwardly from the first portion 22. Such third portion 30 curves in a third direction which is away from the first portion 22 and then in a forth direction towards the first portion 22. As shown in FIGS. 2-4, the third portion 30 is disposed opposite the second portion 24 in relationship to a vertical axis of such mailbox 10. Furthermore, a free edge 32 of the third portion 30 is disposed in a predetermined relationship to the free edge 28 of the second portion 24, which is a parallel relationship.

In the presently preferred embodiment, the first portion 22 is generally flat and the resilient member 20 includes a generally flat portion 34 which extends outwardly from the free edge 28 of the second portion 24. Such generally flat portion 34 may be disposed substantially coplanar with the generally flat first portion 22. Alternatively, such flat portion 34 may be disposed at a predetermined angle to the generally flat first portion 22. As best shown in FIG. 3, the second portion 24 recurves outwardly from the generally flat first portion 22 and the flat portion 34 is disposed perpendicular thereto. The flat portion 34 may further extend past the generally flat first portion 22. When the flat portion 34 extends past the generally flat first portion 22, such flat portion 34 will be spaced from the first mounting member 16 to enable the resilient member 20 to temporarily change its original shape and further enable movement of the mailbox 10.

Figure 6:
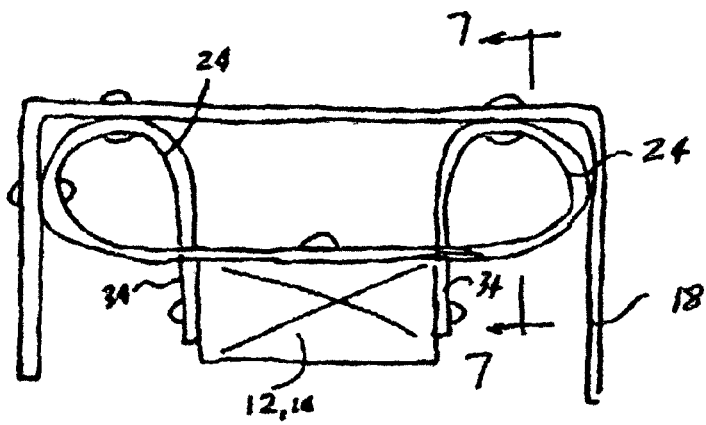
FIG. 6 is an end view of the shock and vibration absorbing device according to yet another embodiment of the present invention.
Figure 7:
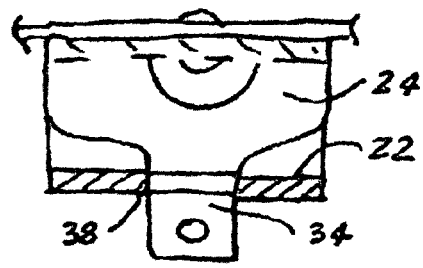
FIG. 7 is a cross-sectional view of the shock and vibration absorbing device taken along the lines 7-7 of FIG. 6.

As shown in FIGS. 6-7, the second portion 24 recurves inwardly and forms at least a 270 degree loop and at least the free edge 28 of the second portion extends past the first portion 22 which includes at least one aperture 38 formed therein. The free edge 28, and preferably the flat portion 34, are passed through such at least one aperture 38.

In further reference to FIG. 4, the resilient member 20 includes at least one of a cutout 40 and aperture 42 for varying a resiliency of the resilient member 20 in absorbing such at least one of shock and vibration.

In use, the first portion 22 is either directly secured to the arm 14 or the post 12 or first secured to the first mounting bracket 16 which is attached to such arm 14 or the post 12. The second portion 24 at least abuttingly engages the mailbox 10 or the second mounting bracket 18 attached to the mailbox 10. It will be understood that the mailbox 10 is capable of withstanding application of a predetermined impact force which is capable of causing at least one of a shock and a vibration.

The resilient member 20 temporarily changes its original shape upon application of the predetermined impact force and movement of the mailbox 10 and then returns to the original shape after removal of the predetermined impact force for absorbing such at least one of shock and vibration. When first mounting bracket 16 and second mounting bracket 18 are employed, such brackets are configured to enable movement of mailbox 10 and further enable the resilient member 20 to temporarily change its original shape. Advantageously, the flanges of second mounting bracket 18 will be spaced from either the flanges of first mounting bracket 16 or directly from the mounting post 12 or arm 14.

As shown in FIGS. 2-4, the second portion 24, being adapted with the flat portion 34, may be fastened to the mailbox 10 or the second mounting bracket 18 with a well known fastener 44, such as a rivet. A plurality of reinforcing members 46 and 48 may be provided for aiding in fastening of such resilient member 20 manufactured from a compressible resilient material such as elastomer, fabric, polymer and the like. Such members 46 and 48 may be disposed in an external abutting engagement with the resilient member 20 or may be disposed integral thereto. As shown in FIGS. 6-7, the second portion 24, is adapted with the flat portion 34, may be fastened to the arm 14 or the first mounting bracket 16.

In further reference to FIG. 3, at least one independent resilient member, referenced by numeral 21, may be employed for engagement with either the left and right end of the mailbox 10 of FIG. 1, and at least one additional resilient 20 may be employed for engaging the side of the mailbox 10 of FIG. 1.

Figure 5:
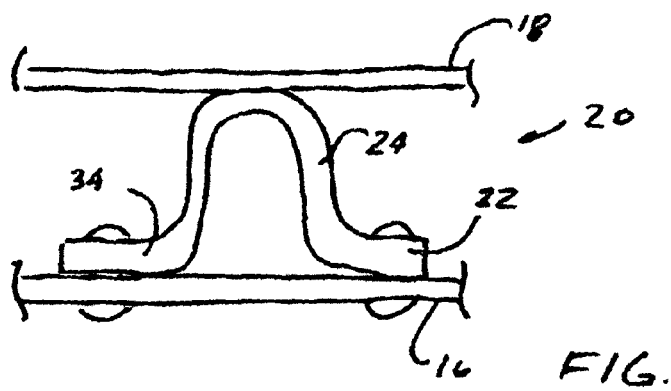
FIG. 5 is an end view of the shock and vibration absorbing device according to another embodiment of the present invention.

FIG. 5 illustrates another embodiment of the present invention, wherein the first portion 22 is generally flat, the second portion 24 has a U-shape and the third portion 34 extends outwardly from a free edge of the second portion and is disposed substantially coplanar with the first portion 22. By way of example of FIG. 5, the second portion 24 abuts the second mounting bracket 18 and the first portion 22 and the third portion 34 are affixed to the first mounting bracket 16. It will be appreciated that orientation of the resilient member 20 may be reversed. Furthermore, the second portion 24 may be fastened to either the first mounting bracket 16 or the second mounting bracket 18. Alternatively, the second portion 24 may be adapted with a V-shape in applications requiring increased flexibility of the resilient member 20.

Figure 8:
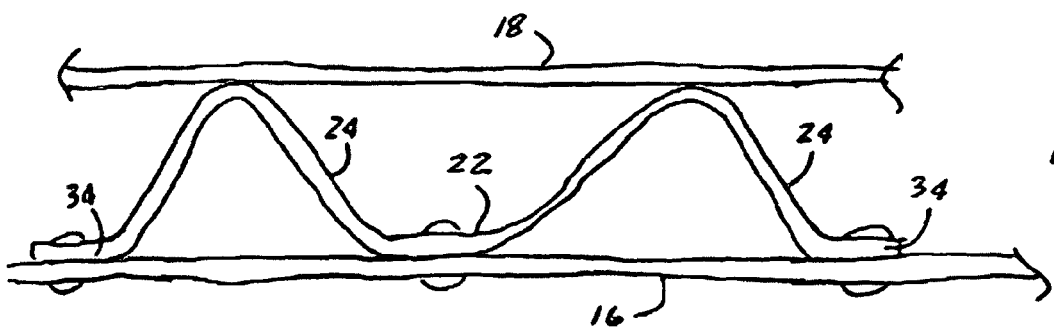
FIG. 8 is an end view of the shock and vibration absorbing device according to a further embodiment of the present invention.

FIG. 8 illustrates yet another embodiment of the present invention, wherein the resilient member 20 includes a first portion 22, a pair of second portions 24 each having a V-shape and extending from opposed edges of the first portion 22 and a pair of third portions 34 each extending from a free edge of the respective second portion 24. By way of example of FIG. 8, the third portions 34 are coplanar with the first portion 22 and are mechanically fastened to the first mounting bracket 16. As has been stipulated above in reference to FIG. 5, the orientation of the resilient member 20 may be reversed when required.

Figure 9:
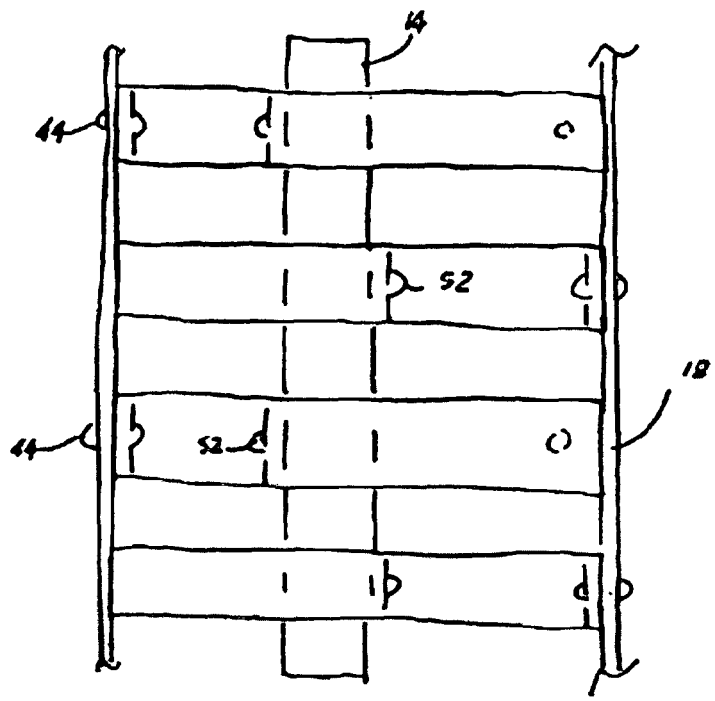
FIG. 9 is a plan view of the shock and vibration absorbing device according to yet a further embodiment of the present invention.
Figure 10:
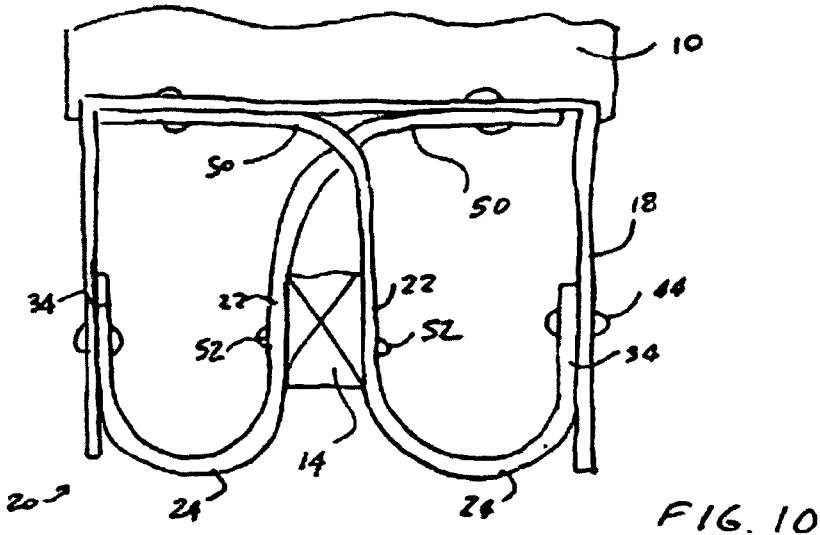
FIG. 10 is an end view of the shock and vibration absorbing device of FIG. 9.

Now in reference to FIGS. 9-10 there is illustrated a further embodiment of the present invention, wherein a plurality of resilient members 20 are employed for absorbing at least one of shock and vibration. By way of example in FIG. 10, each resilient member 20 is illustrated, in an end view or cross-section, as having a generally elongated shape and may further include a portion 50 which curves in a direction which is opposite to the curving and recurving of the second portion 24 as related to the plane of the first portion 22. Furthermore, each resilient member 20 is illustrated as being attached directly to the generally horizontal arm 14 of the mounting post 12 with fasteners 52. It will be apparent to those skilled in the art that other end view configurations of each resilient member 20, will be applicable for absorbing at least one of shock and vibration.

Figure 11:
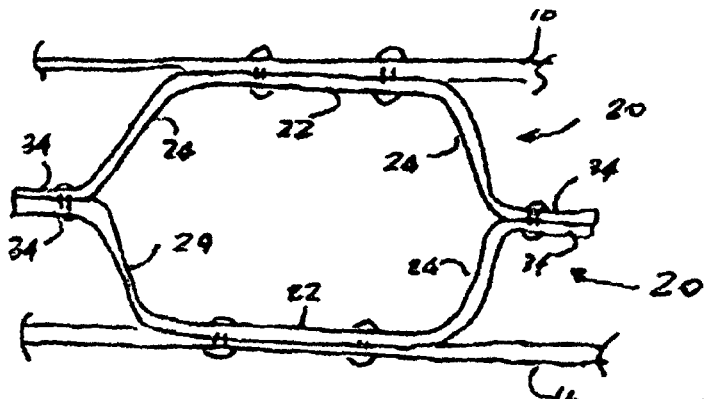
FIG. 11 is an end view of the shock and vibration absorbing device according to still another embodiment of the present invention.

FIG. 11 illustrates yet a further embodiment of the present invention, wherein a pair of recurved resilient members 20, each having a pair of opposed second portions 24 and a pair of third portions 34, are connected together and wherein one resilient member 20 at least abuttingly engages first mounting bracket 16 and second resilient member 20 at least abuttingly engages the second mounting bracket 18. It will be appreciated that such pair of resilient members 20 may be connected together at the first portion 22 with third portions 34 being employed for attachment to the first mounting bracket 16 and the second mounting bracket 18.

The resilient member 20 may be formed from a generally flat material, which is advantageous for simply providing a shape illustrated in FIGS. 1-4 which is capable of absorbing shock and vibration in all three axis. Alternatively, the resilient member 20 may be made from one of an extrusion, stamping, molding and casting.

The material of the resilient member 20 may be one of metal, fiberglass, polymer, engineered plastic, fabric, elastomer and various combinations thereof. It will be apparent to those skilled in the art that the material will be selected to accommodate various temperature ranges as well as various climatic and chemically harsh environments.

Figure 12:
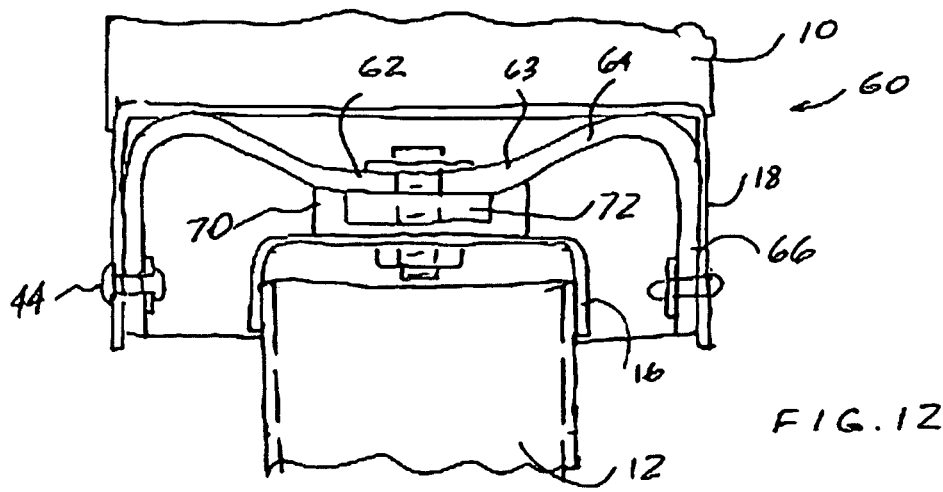
FIG. 12 is an end view of the shock and vibration absorbing device according to another embodiment of the present invention.
Figure 13:
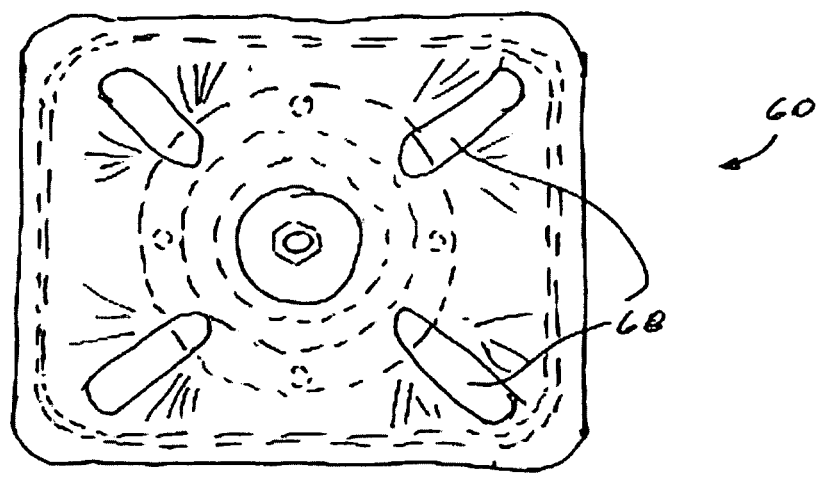
FIG. 13 is a plan view of the shock and vibration absorbing device of FIG. 12.

Now in reference to FIGS. 12-13, there is shown still a further embodiment of the present invention wherein the resilient member, generally designated as 60, is advantageous for attaching the mailbox 10 to the vertical post 12 either directly or through use of the first mounting bracket 16 and the second mounting bracket 18.

In such embodiment, the resilient member 60 is illustrated as having a continuous second portion 64 which extends about a peripheral edge 63 of the first portion 62. A peripheral third portion 66 may be further provided for additional securement to the second mounting bracket 18 or directly to the mailbox 10.

Each of the first portion 62 and the second portion 64 has a predetermined shape. For example, as shown in FIGS. 12-13, the predetermined shape of the first portion 62 is generally round and the predetermined shape of the second portion 64 is generally square. Accordingly, the peripheral edges of such first portion 62 and the second portion 64 exhibit a predetermined shape. As described supra, a plurality of apertures 68 or notches (not shown) may be provided for adjusting resiliency of the resilient member 60. Furthermore, the first portion 62 may be provided with a boss 70 for housing a bearing 72 which enables simple rotation of the mailbox 10 about the post 12 in the event of the impact force being applied to such mailbox 10.

Alternatively, the boss 70 may be incorporated into first mounting member 16 in a manner which allows rotation of the mailbox 10 or, alternatively, a portion of such first mounting member 16 may be raised for elevating the first portion 62.

Figure 14:
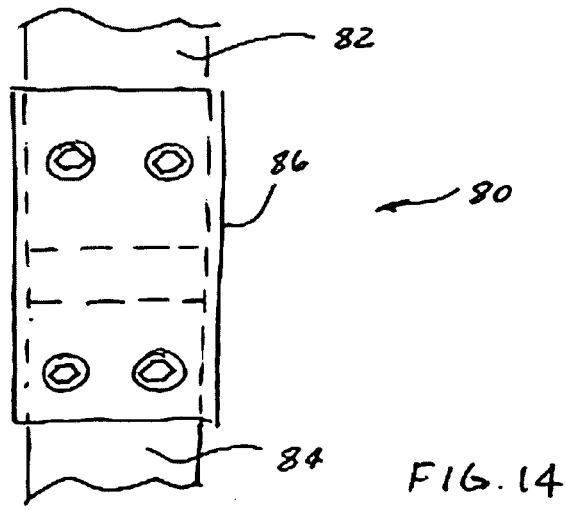
FIG. 14 is an elevation view of the shock and vibration absorbing device according to yet another embodiment of the present invention in use for coupling a pair of elongated members.

Now in reference to FIGS. 14-17, there is illustrated yet another embodiment of the resilient member, generally designated as 80, for absorbing at least one of a shock and a vibration between a first elongated member 82 and a second elongated member 84 which is disposed in a spaced relationship to such first member. FIG. 14 illustrates an elongated sleeve like member 86 which is fastened to an end of the first elongated member 82 and an opposed end of the second elongated member 84.

In reference to FIG. 15, the resilient member 80 is illustrated as having at least a partially open shape. Particularly, there is a pair of U-shaped resilient members 90 being attached together and wherein flanges 92 of a first U-shaped resilient member 90 is attached to such first elongated member 82 and flanges 92 of second U-shaped resilient member 90 is attached to the second elongated member 84.

In reference to FIG. 16, flanges 92 of U-shaped resilient member 90 are secured to one of such first elongated member 82 and the second elongated member 84 and the U-shaped resilient member 90 includes at least one elongated member 94 extending outwardly therefrom for affixing to an opposed one of such first elongated member 82 and such second elongated member 84.

In further reference to FIG. 17, a base portion of the U-shaped resilient member 90 is secured to one of such first elongated member 82 and such second elongated member 84 and flanges 92 of the U-shaped resilient member 90 are secured to an opposed one of such first elongated member 82 and such second elongated member 84.

It will be appreciated that an L-shape member may be provided instead of a U-shape member 90. A first flange 92 of the L-shaped resilient member is secured to one of such first elongated member 82 and such second elongated member 84 and said a second flange is secured to an opposed one of such first elongated member 82 and such second elongated member 84.

The embodiment of FIGS. 14-17 is advantageous for use as a boat dock hinge, as a drive shaft coupling, or for enabling movement of the post 12 about its vertical axis, wherein the post 12 is formed as a pair of sections, with a first section located in close proximity to a ground surface.

Although the present invention has been mainly shown in terms of attaching a mailbox to the mounting post, it will be apparent to those skilled in the art, that the present invention may be applied to other devices requiring absorption of shock and vibration. For example, the present invention may be employed as a loading dock bumper, boat dock bumper or simply as a vehicle bumper. Furthermore, the resilient member of the present invention may be advantageous in use as a door or a gate hinge. Additionally, it may be employed as a motor mount or for mounting electronic devices and components.

Although the present invention has been shown in terms of a mechanical fastening of the resilient member, it should be apparent to those skilled in the art that at least a predetermined portion of the resilient member may be secured by an adhesive or securely caged by the shape and construction of the device.

Additionally, other configurations of the first mounting member 16 and the second mounting member 18 may be employed in various applications. Furthermore, at least a first mounting bracket 16 may be permanently attached to the post 12, for example, by a welding method.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit of the invention as set forth in the appended claims.

I claim:

1. A method of absorbing at least one of a shock and a vibration, said method comprising the steps of:
    (a) providing at least one resilient member having:
        (i) a predetermined shape,
        (ii) a generally flat first portion, and
        (iii) a second portion extending outwardly from said first portion, said second portion curving in a first direction which is away from said first portion and then recurving in a second direction which is towards said first portion,
        (iv) a generally flat third portion which extends downwardly from a distal edge of said second portion toward said generally flat first portion and is disposed perpendicular thereto, wherein said distal edge is distal to said first portion;
    (b) providing a first member;
    (c) disposing a second member in spaced movable relationship relative to said first member;
    (d) securing said first portion of said at least one resilient member to one of said first member and said second member;
    (e) at least abuttingly engaging said second portion of said at least one resilient member to an opposed one of said first member and said second member;
    (f) temporarily changing original shape of said resilient member; and
    (g) moving said second member relative to said first member.

2. The method, according to claim 1, wherein said third portion has a generally straight free edge.

3. The method, according to claim 1, wherein said third portion is spaced from said first member.

4. The method, according to claim 1, wherein said method includes a step of securing said second portion to at least one of said first member and said second member.

5. The method, according to claim 1, wherein said at least one resilient member is formed from a generally flat material.

6. The method, according to claim 1, wherein said at least one resilient member is made from one of an extrusion, stamping, molding and casting.

7. The method, according to claim 1, wherein a material of said at least one resilient member is one of metal, fiberglass, polymer, engineered plastic, fabric, elastomer and various combinations thereof.

8. The method, according to claim 1, wherein said at least one resilient member includes at least one of a cutout and aperture for varying a resiliency of said at least one resilient member to absorb such one of shock and vibration.

9. The method, according to claim 1, wherein said at least one of shock and vibration is generated by a force applied to said second member.

10. The method, according to claim 9, wherein said force is an impact force.

11. The method, according to claim 1, wherein said first member is stationary.

12. A method of absorbing at least one of a shock and a vibration, said method comprising the steps of:
    (a) providing at least one resilient member having:
        (i) a predetermined shape,
        (ii) a first portion,
        (iii) a second portion extending outwardly from said first portion, said second portion curving in a first direction which is away from said first portion and then recurving in a second direction which is towards said first portion, and
        (iv) at least one of a cutout and aperture for varying a resiliency of said at least one resilient member to absorb said at least one of shock and vibration;
    (b) securing said first portion to one of a first member and a second member, said second member capable of withstanding application of at least one of a shock and a vibration;
    (c) at least abuttingly engaging said second portion to an opposed one of said first member and said second member; and
    (d) temporarily changes original shape of said at least one resilient member.

13. The method, according to claim 12, wherein said first portion is generally flat and said resilient member includes a generally flat third portion which extends outwardly or downwardly from a distal edge of said second portion, wherein said distal edge is distal to said first portion.

14. The method, according to claim 13, wherein said third portion extends outwardly from said distal edge of said second portion away from said generally flat first portion and is disposed substantially parallel with said generally flat first portion.

15. The method, according to claim 13, wherein said third portion extends downwardly from said distal edge of said second portion toward said generally flat first portion and is disposed at a predetermined angle to said generally flat first portion.

16. The method, according to claim 15, wherein said third portion is disposed perpendicular to said generally flat first portion.

* * * * *